Aug. 6, 1935.   W. L. SCRIBNER   2,010,113
ROLLER BEARING CAGE
Filed Nov. 21, 1934
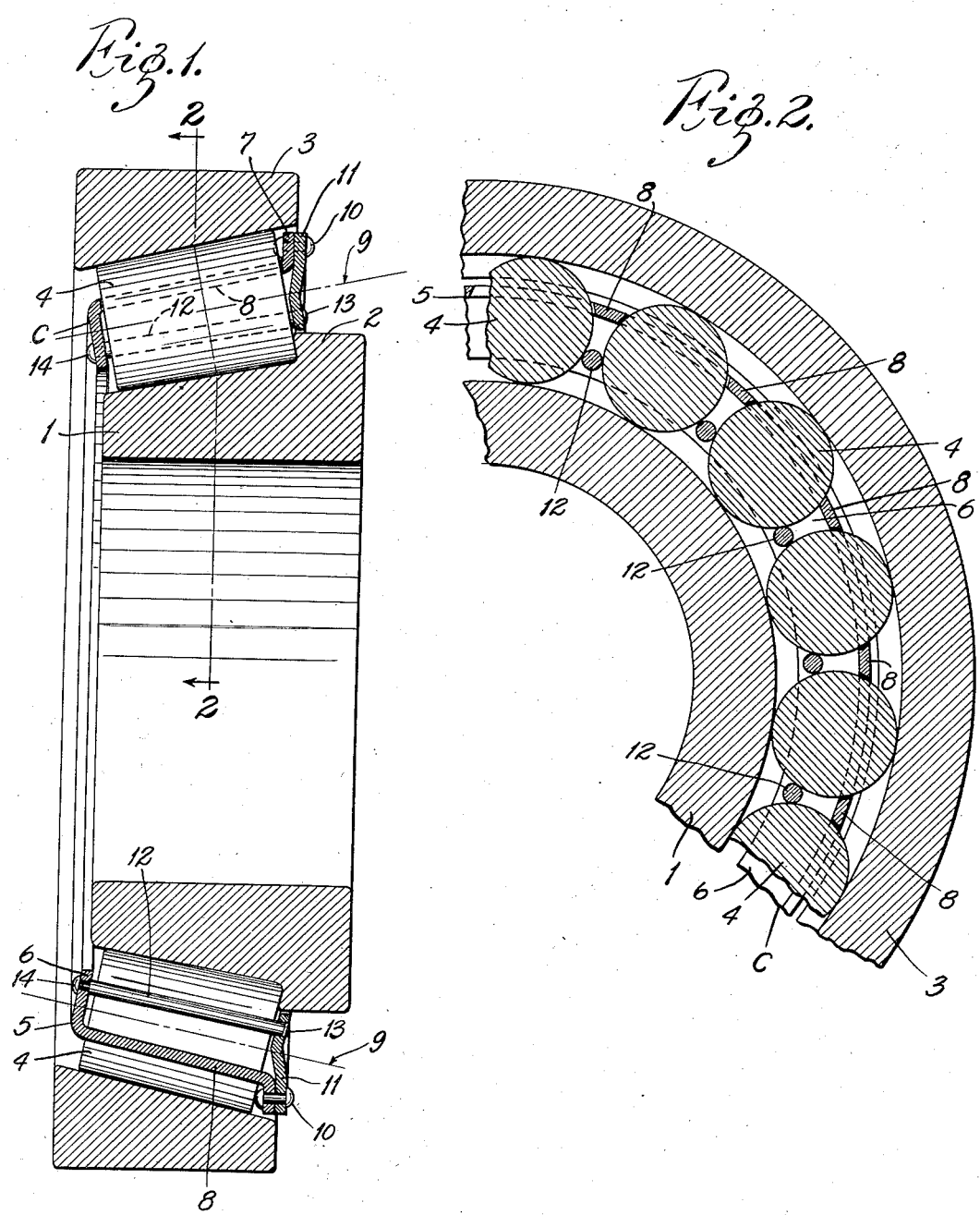
INVENTOR:
William L. Scribner,
HIS ATTORNEYS.

Patented Aug. 6, 1935

2,010,113

UNITED STATES PATENT OFFICE 2,010,113

ROLLER BEARING CAGE

William L. Scribner, Canton, Ohio, assignor to The Timken Roller Bearing Company, Canton, Ohio, a corporation of Ohio Application November 21, 1934, Serial No. 754,033

7 Claims. (Cl. 308—218)

My invention relates to cages for roller bearings, particularly for taper roller bearings of large, heavy duty sizes, such as those used in railroad bearings, rolling mills and the like. The invention has for its principal objects to simplify, cheapen and lighten such cage constructions and, at the same time, to make them rigid and to improve the lubrication of the bearing rollers.

The invention consists principally in a cage combining features of the well known pressed cup type of cage and the well known pin type of cage. The invention further consists in the roller bearing cage and in the parts and combinations and arrangements of parts hereinafter described and claimed.

In the accompanying drawing, which forms part of this specification and wherein like symbols refer to like parts wherever they occur, Fig. 1 is a longitudinal sectional view of a taper roller bearing provided with a cage embodying my invention; and Fig. 2 is a fragmentary cross sectional view, on the line 2—2 of Fig. 1.

In the drawing is shown a taper roller bearing of a well known type including a cone 1 or inner bearing member having a thrust rib 2 at the large end of its raceway, a cup 3 or outer bearing member, a series of conical rollers 4 interposed between said bearing members and a cage C for maintaining said rollers in position.

The present invention is concerned with the construction of said cage C which includes a cup-like body 5 of pressed or stamped metal radially offset outwardly with respect to the conical locus of the roller axes. Said body comprises an inturned flange 6 at the small end thereof, an outturned flange 7 at the large end thereof and conically disposed bridges 8 connecting said flanges and forming roller pockets, said bridges being disposed radially outward with respect to the roller axes 9. Said small end flange 6 extends inwardly beyond the roller axes.

Secured to the large end flange 7, as by rivets 10, is a ring 11 that extends inwardly beyond the roller axes, its inner periphery being close to the outer periphery of the thrust rib 2 of the bearing cone. Extending from the inner portion of said ring 11 to the inner portion of the small end flange 6 and alined with said bridges 8 are pins 12. These pins are secured to said ring 11 as by welding (indicated at 13) and to the small end flange 6 as by riveting (indicated at 14).

As the pins 12 are disposed radially inwardly with respect to the roller axes 9 and the bridges 8 radially outwardly with respect to said axes, the rollers 4 and cage C form a self-contained unit separable from both bearing members. The construction permits the use of light metal for the cup and the cage and rollers are easily assembled. The assembly is rigid and the cage is braced against twisting. The use of solid bearing rollers is permitted and the cage construction facilitates the lubrication of the bearing rollers, particularly the large end portions thereof.

Obviously numerous changes may be made without departing from the invention and I do not wish to be limited to the precise construction shown.

What I claim is:

1. A roller bearing cage comprising annular end flanges connected by bridges integral with said end flanges and forming pockets for rollers, a ring secured to one of said end flanges, and pins alining with said bridges and connecting said end ring with the flange at the other end of said cage, said bridges and said pins being disposed on opposite sides of the conical locus of the roller axes.

2. A conical roller bearing cage comprising an inturned annular small end flange and an outturned annular large end flange connected by bridges integral with said end flanges and forming pockets for rollers, a ring secured to said large end flange, and pins alining with said bridges and connecting said end ring with said small end flange and arranged to retain the rollers in the cage.

3. A conical roller bearing cage comprising a pressed cup having an inturned annular small end flange and an outturned annular large end flange connected by bridges integral with said end flanges and disposed outwardly with respect to the roller axes and forming pockets for the rollers, a ring secured to said large end flange, and pins alining with said bridges and connecting said end ring with said small end flange inwardly with respect to the roller axes.

4. A cage for tapered bearing rollers comprising annular end flanges connected by conically disposed bridges integral with said end flanges and forming pockets for the rollers, an end ring secured to one of said end flanges and pins alining with said bridges and connecting said end ring with the flange at the other end of said cage, said bridges and said pins being disposed on opposite sides of the conical locus of the roller axes.

5. A cage for tapered bearing rollers comprising an annular small end flange and an outturned annular large end flange connected by conically disposed bridges forming pockets for the rollers, an end ring secured to said large end flange and pins alining with said bridges and connecting said end ring with said small end flange, said bridges and said pins being disposed on opposite sides of the conical locus of the roller axes.

6. A taper roller bearing comprising a bearing cone having a thrust rib at its large end, a bearing cup, conical rollers between said cup and cone and a cage for said rollers comprising an inturned annular small end flange and an outturned annular large end flange connected by conically disposed bridges forming pockets for the rollers, an end ring secured to said large end flange and pins alining with said bridges and connecting said end ring with said small end flange, said bridges and said pins being disposed on opposite sides of the conical locus of the roller axes and the inner periphery of said end ring extending close to said thrust rib.

7. A bearing roller and cage assembly, said cage comprising an inturned small end flange and an outturned large end flange connected by bridges disposed outwardly with respect to the roller axes and forming pockets for the rollers, a ring secured to said large end flange, a pin alining with each of said bridges and connecting said end ring with said small end flange, said pins being disposed inwardly with respect to the roller axes, whereby said cage and rollers constitute a self-contained unit.

WILLIAM L. SCRIBNER.